US009311192B2

(12) United States Patent
Denny et al.

(10) Patent No.: US 9,311,192 B2
(45) Date of Patent: Apr. 12, 2016

(54) METHODS, SYSTEMS, AND PRODUCTS FOR DATA BACKUP

(75) Inventors: Michael Denny, Sharpsburg, GA (US); Hong Nguyen, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 254 days.

(21) Appl. No.: 13/434,892

(22) Filed: Mar. 30, 2012

(65) Prior Publication Data
US 2012/0185431 A1    Jul. 19, 2012

Related U.S. Application Data

(63) Continuation of application No. 11/930,362, filed on Oct. 31, 2007, now Pat. No. 8,170,987.

(51) Int. Cl.
*G06F 11/14*    (2006.01)
(52) U.S. Cl.
CPC ........ *G06F 11/1464* (2013.01); *G06F 11/1461* (2013.01); *G06F 11/1469* (2013.01)
(58) Field of Classification Search
CPC .................................................. G06F 11/1469
USPC ......... 707/610, 640, 661, 674, 675, 678–682, 707/685, 686, 999.202, 999.203; 712/150; 711/164; 705/34; 455/414.2
See application file for complete search history.

(56) References Cited

U.S. PATENT DOCUMENTS

| | | | |
|---|---|---|---|
| 6,484,033 B2 | 11/2002 | Murray | |
| 6,874,037 B1 | 3/2005 | Abram et al. | |
| 7,330,997 B1 | 2/2008 | Odom | |
| 7,395,282 B1 | 7/2008 | Crescenti et al. | |
| 7,584,201 B2 | 9/2009 | Casey | |
| 2002/0059094 A1* | 5/2002 | Hosea et al. | 705/10 |
| 2004/0163029 A1 | 8/2004 | Foley et al. | |
| 2005/0131996 A1 | 6/2005 | Mastrianni et al. | |
| 2005/0138517 A1* | 6/2005 | Monitzer | 714/746 |
| 2006/0053177 A1 | 3/2006 | Suomela et al. | |
| 2006/0089152 A1 | 4/2006 | Mahonen | |
| 2007/0067297 A1* | 3/2007 | Kublickis | 707/9 |
| 2007/0095892 A1* | 5/2007 | Lyons et al. | 235/379 |
| 2007/0266062 A1 | 11/2007 | Young | |
| 2008/0004947 A1* | 1/2008 | Mathew et al. | 705/14 |
| 2008/0126436 A1* | 5/2008 | Thorn | 707/201 |
| 2008/0214163 A1* | 9/2008 | Onyon et al. | 455/414.2 |
| 2008/0282186 A1* | 11/2008 | Basavaraju | 715/781 |
| 2010/0205152 A1* | 8/2010 | Ansari et al. | 707/654 |

\* cited by examiner

*Primary Examiner* — Syling Yen
(74) *Attorney, Agent, or Firm* — Scott P. Zimmerman, PLLC (57) ABSTRACT

Methods, systems and computer program products automatically back-up data. Communication is established among a first device, a second device, and a network-based storage device. Key words associated with uniform resource locators are identified and stored in the network-based storage device. When corruption is detected of the data stored in the first device, the key words are automatically retrieved from the network-based storage device and listed in a user interface displayed at the second device.

17 Claims, 4 Drawing Sheets

METHODS, SYSTEMS, AND PRODUCTS FOR DATA BACKUP

CROSS-REFERENCE TO RELATED APPLICATIONS

This application is a continuation of U.S. application Ser. No. 11/930,362, filed Oct. 31, 2007, now issued as U.S. Pat. No. 8,170,987, and incorporated herein by reference in its entirety.

BACKGROUND

The present application relates generally to data and, more particularly, to methods, systems, and computer program products for data backup and recovery.

Data processing devices, such as personal computers (PCs), wireless devices, and other consumer electronic devices typically contain data in a file format. At least some of the data on these devices needs to be backed up to protect against crashes and/or for archival purposes to allow for future recovery in case of data loss. Some operating systems include backup and recovery tools that may allow users to personally backup and recover their data. Unfortunately, conventional data backup tools may not be automatic, may not be user friendly, and may be complex and non-intuitive to the general user, particularly with respect to selection of files to be backed up. Conventional data backup tools typically are "volume centric" in that they allow selection and backup of large groups of files, rather than selection and backup of individual files. In addition, the amount of data stored on user devices has increased dramatically in recent years. The sheer volume of data may make it difficult for users to periodically backup their data. With respect to wireless devices, back up of data typically should be performed at non-peak times, particularly when a user is being charged for connection time, which may be inconvenient for a user. As such, many users do not currently back up data on their devices and, thus, may not be able to restore files in the aftermath of a device crash or other event that causes data loss.

SUMMARY

According to exemplary embodiments, systems, methods and computer program products are provided that facilitate intelligent, automatic selection of content on consumer electronic devices to be backed up. User-defined rules selectively and automatically backup data to a network, to another external device or even to an internal chip or memory. Via a user-friendly interface, users can initially set up the criteria (e.g., files to be backed up and location for storage of backed up data, etc.) for data backup, and thereafter, data backup can occur automatically.

According to some embodiments, a data backup and retrieval system includes a network based storage service device that is configured to identify for backup content stored on a customer premise equipment (CPE) device connected or connectable to a communications network, and to store a copy of the identified content at one or more locations remote from the CPE device via the communications network. The network based storage service device includes a content identification module that automatically identifies content to be backed up based on rules associated with, for example, content file type, content creation date, content storage location on the CPE device, content priority, user identification, and/or user activity. In addition, the network based storage service device may be configured to identify content to be backed up and to store a copy of the identified content at one or more locations remote from the CPE device in response to receiving a user request from the CPE device. The network based storage service device includes a content replication module that is configured to retrieve content stored at the one or more remote locations and replicate the retrieved content on the CPE device, for example, when the content has become corrupted on the CPE device, when the content is lost, when the CPE device crashes, etc.

The network based storage service device requests user input to establish rules that allow the network based storage service device to intelligently identify content to be backed up. In some embodiments, a user interface is displayed on the CPE device that allows a user to provide various criteria for establishing the rules.

Once identified, content to be backed up can be stored at one or more remote locations immediately, at one or more predetermined future times, and/or at other favorable times. For example, identified content can be stored at one or more remote locations at a time when communications network traffic is at a reduced level, or at a time when user charges for use of a communications network are lower or nonexistent. In some embodiments, content may be stored at one or more remote locations in a compressed format.

Some CPE devices may access content at a remote location, for example, at a web server. The network based storage service device is configured to identify content accessed by a CPE device and to store metadata associated with the accessed content. For example, the network based storage service device may store keywords, content address, etc.

According to other embodiments, a data backup and retrieval system includes a network based storage service device that may be utilized with a plurality of interconnected or interconnectable CPE devices. The network based storage service device is configured to identify for backup content stored on each of a plurality of CPE devices connected or connectable to a communications network and located in proximity to each other, and to store a copy of the identified content at one or more of the other CPE devices. The network based storage service device is configured to automatically identify content to be backed up based on rules associated with, for example, content file type, content creation date, content storage location on the CPE device, content priority, user identification, and/or user activity. The network based storage service device is also configured to retrieve content stored at one or more of the proximity devices and replicate the retrieved content on a CPE device, for example, when the content has become corrupted on the CPE device, when the content is lost, when the CPE device crashes, etc. The network based storage service device displays a user interface on a CPE device that includes a listing of the content on each proximity device. As such, a user can see what content is stored on each of the devices and what backup content is stored on each of the devices. In some embodiments, when more than one user utilizes a CPE device, the network based storage service device maintains a separate user log for the content of each user.

A data backup and retrieval method, according to some embodiments, includes automatically identifying content stored on a CPE device to be backed up, determining one or more locations remote from the CPE device for storing the identified content, and storing a copy of the identified content at the one or more locations. The content to be backed up is automatically identified based on rules associated with content file type, content creation date, storage location on the CPE device, content priority, user identification, and/or user activity. Identified content may be stored at one or more devices in proximity to a CPE device. When a CPE device loses content as a result of a crash or other cause of data loss, the stored content is retrieved from the one or more remote locations and replicated on the CPE device.

Other systems, methods and computer program products according to exemplary embodiments will be or become apparent to one with skill in the art upon review of the following drawings and detailed description. It is intended that all such additional systems, methods and computer program products be included within this description, be within the scope of the present invention, and be protected by the accompanying claims.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, steps, operations, elements, and/or components, but does not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments may be implemented as systems, methods, and/or computer program products. Accordingly, the exemplary embodiments may be implemented in hardware and/or in software, including firmware, resident software, micro-code, etc. Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

As used herein, the terms "data" and "content" are interchangeable and mean any type of audio information, video information, audio/video information, text, images, games, applications, sensor data, medical records, etc., that is in a file format and that can be backed up and recovered.

Computer program code for carrying out operations of data processing systems discussed herein may be written in a high-level programming language, such as Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. Exemplary embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to flowchart and/or block diagram illustrations of methods, systems, and computer program products in accordance with exemplary embodiments of the invention. These flowchart and/or block diagrams further illustrate exemplary operations for facilitating intelligent backup of data, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks. The computer program instructions can be executed within one or more network devices implementing the network service described below and/or within any user device.

Figure 1:
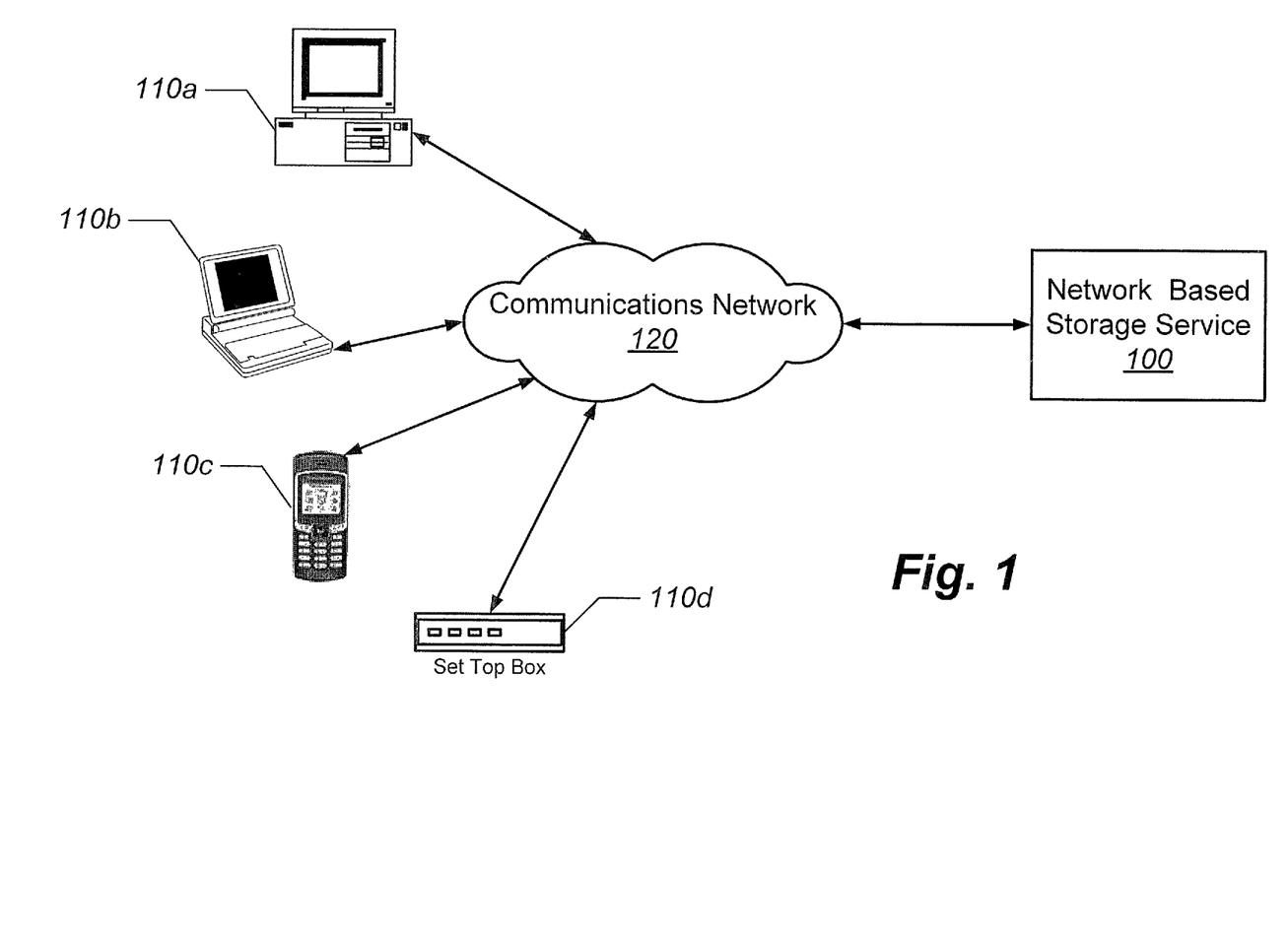
FIGS. 1 and 2 are block diagrams that illustrate software/hardware architectures for intelligently identifying content and backing up identified content, according to some embodiments.

Referring to FIG. 1, a data backup and retrieval system, according to some embodiments, is illustrated. The illustrated system includes an "intelligent" network based storage service device 100 (shown in detail in FIG. 4) that provides a network service to identify for backup content stored one or more a customer premise equipment (CPE) devices (110*a*, 110*b*, 110*c*, 110*d*) that are connectable to a communications network 120, and to store a copy of the identified content at one or more locations remote from the respective CPE device via the communications network 120. The network based storage service device 100 is also configured to retrieve content stored at the one or more remote locations and replicate the retrieved content on a CPE device, for example, when the content becomes corrupted on the CPE device, when the content is lost, when the CPE device crashes, etc.

The illustrated CPE devices include a desktop computer 110*a*, a laptop or other mobile computing device 110*b*, a cell phone or PDA 110*c*, and a set top box 110*d*. However, the network based storage service device 100 is configured to identify content and backup content from any type of device that can be connected to a communications network. For example, CPE devices may include web-enabled cameras and any other devices configured to create content and/or access content from another source, without limitation. The term "CPE device" is intended to include all user devices connected to a communications network or capable of being connected to a communications network.

Communications network 120 may be the Internet or other publicly accessible network, a wide area network, a local area network, an Intranet, or other private network, etc. Communication network 120 may also include a combination of public and private networks or a virtual private network (VPN). Communications via the communication network 120 may occur over-the-air and/or through a dedicated distribution network. The illustrated communications network 120 is intended to include all possible types of communications networks, without limitation.

In some embodiments, the network based storage service device 100 is configured to identify content accessed by a CPE device (110*a*, 110*b*, 110*c*, 110*d*), for example, content accessed from a web server via the internet. The network based storage service device 100 stores metadata associated with accessed content at one or more remote locations. The stored metadata includes enough information to allow a user to return to the source of the content. Exemplary metadata may include, but is not limited to, an address of the content (i.e., a uniform resource locator or URL, etc.), key words associated with the content, etc.

The network based storage service device 100 automatically identifies content to be backed up based on established rules. These rules provide the network service with the "intelligence" to identify content that should be backed up with little or no input required from a user. The rules for establishing this intelligence may be predefined by the network based storage service device 100 and/or may be defined based on input from a user of a CPE device (110*a*, 110*b*, 110*c*, 110*d*). User input may be provided initially, prior to use of the network service. User input may also be continuously solicited by the network based storage service 100 device in order to improve the quality of content backup.

Exemplary rules for identifying content to be backed up include, but are not limited to, content file type, content creation date, content storage location on a CPE device, content priority, user identification, and/or user activity. For example, a rule may specify that all image files with the file extension "jpg" are to be identified and backed up, and that all text files with the extension "doc" are to be identified and backed up. As another example, a rule may specify that certain files created in a particular period of time are to be backed up. For example, all "doc" text files created in the last three hours are to be identified and backed up.

As another example, a rule may specify that all files in one or more particular storage folders on a CPE device are to be backed up. For example, all files in the folder "my documents" are to be identified and backed up. Rules may also be directed to identifying content with a certain priority level. For example, image files may have a higher priority than video files. Furthermore, the need to back up files from a particular CPE device may be assigned a priority. For example, a high priority may indicate to always back up files from a device. A medium priority may indicate to sometimes back up files. A low priority may indicate that back up is optional, etc.

As another example, a rule may specify that all files, or some files, associated with a particular user are to be identified and backed up. For example, if multiple users utilize a particular CPE device, the content created by and/or accessed by a particular user may be identified and backed up, i.e., all content associated with "Joe Smith" is to be identified and backed up. As another example, a rule may specify that content that a user is currently creating/modifying/accessing is to be backed up.

User input may be solicited to establish the various rules utilized by the network based storage service device 100. Moreover, user input may also be solicited to identify content to be backed up. The user input may be provided via a user interface displayed on a CPE device. In some embodiments, a displayed user interface may include an easy to understand hierarchical tree structure of files (e.g., a structure similar to Windows® Explorer®) located on a CPE device and/or of content located at other locations. However, embodiments are not limited to such an interface. Various types of user interfaces may be utilized, without limitation.

In some embodiments, content identification and backup may be requested by a user and/or by a CPE device. Such requests may be in addition to and/or in lieu of automatic content identification and backup.

Once identified, content to be backed up is stored at one or more remote locations via the network based storage service device 100. These one or more remote locations may include other CPE devices, other devices located on a local area network (LAN), other devices located on a wide area network (WAN), other locations that are connectable to the communications network 120, etc. In some embodiments, the network based storage service device 100 stores a copy of identified content at one or more remote locations at one or more predetermined times during a day. In other embodiments, the network based storage service device stores a copy of identified content at one or more remote locations at a time when communications network traffic is at a reduced level.

The network based storage service device 100 may be configured to store identified content at one or more remote locations in a compressed format. For example, compression algorithms may be applied to a copy of identified content prior to, or at the time of, storing the content copy at a remote location. Compression technology is well understood and need not be described further herein. Any of various types of compression technologies may be utilized, without limitation.

Figure 2:
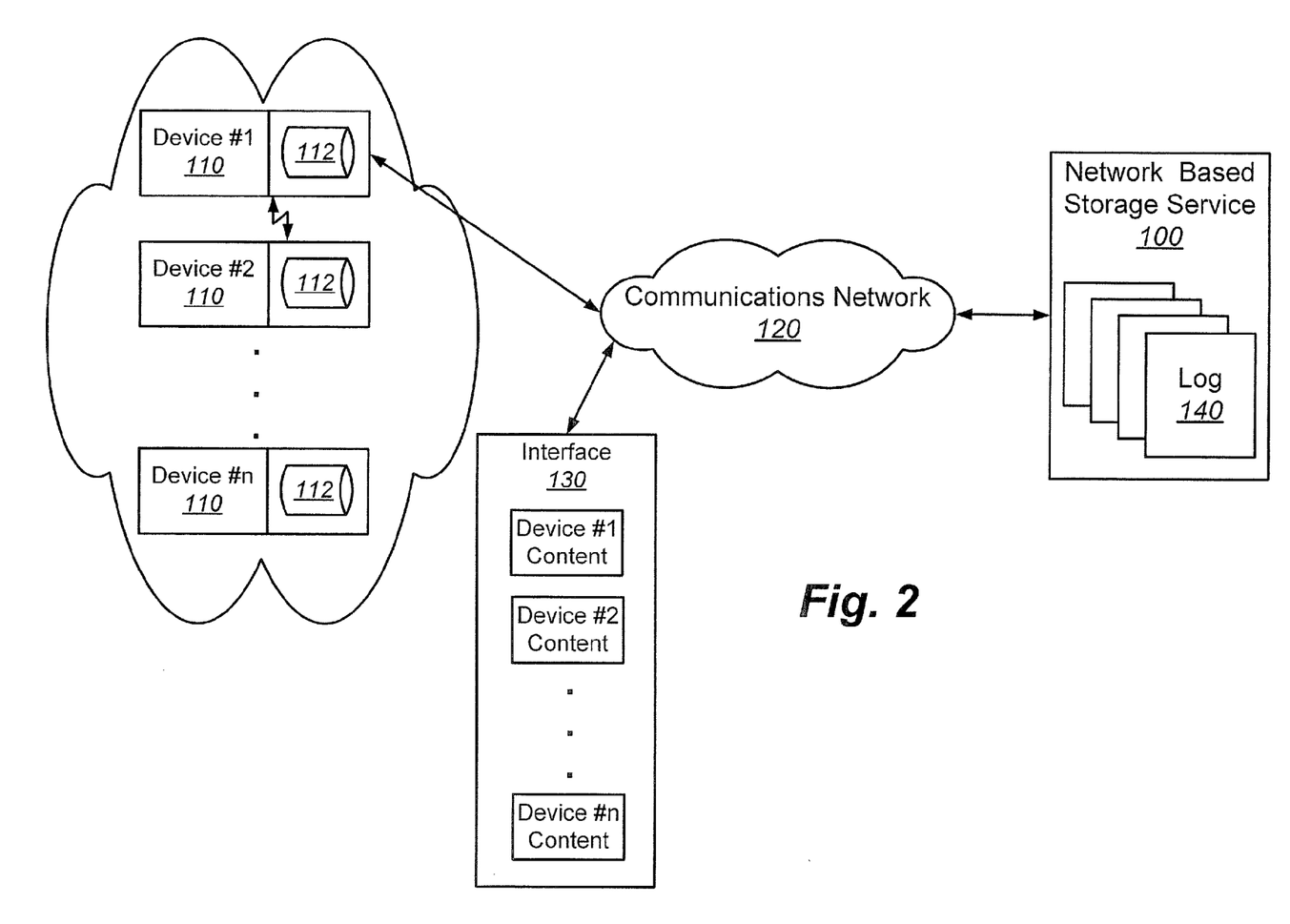

Referring to FIG. 2, the network based storage service device 100 of FIG. 1 may be utilized with a plurality of interconnected or interconnectable CPE devices, referred to as "proximity" devices. In some embodiments, the network based storage service device 100 is configured to identify for backup content stored (e.g., within local data storage 112) on each of a plurality of CPE devices 110 connected or connectable to a communications network 120 and located in proximity to each other, and to store a copy of the identified content at one or more of the other CPE devices. For example, a user with a PDA containing content moves the PDA within a predetermined distance (e.g., twenty feet, etc.) of a desktop PC. Upon recognizing the proximity of the two devices, the network based storage service device 100 stores a copy of identified PDA content on the desktop PC. This content may have been previously identified by the network based storage service device 100 prior to the PDA coming within a predetermined distance of the desktop PC. In some embodiments, content identification may not occur until the PDA comes within a predetermined distance of the desktop PC.

The network based storage service device 100 is configured to automatically identify content to be backed up based on rules, as described above. In some embodiments, content identification and backup may be requested by a user and/or by a CPE device when a CPE device comes within proximity of another CPE device. Such requests may be in addition to and/or in lieu of automatic content identification and backup. The network based storage service device 100 is also configured to retrieve content stored at one or more of the proximity devices and replicate the retrieved content on a CPE device, for example, when the content has become corrupted on the CPE device, when the content is lost, when the CPE device crashes, etc.

The network based storage service device 100 is configured to display a user interface 130 that includes a listing of the content of each proximity device 110. As such, a user can see what content is stored on each of the devices 110 and what backup content is stored on each of the devices. In some embodiments, when more than one user utilizes a CPE device 110, the network based storage service device 100 maintains a separate user log for the content of each user. As such, if one of the CPE devices 110 is utilized by two users with different access privileges, for example, such that each user can only access his/her respective content, the network based storage service device, via the use of logs 140, knows what content to backup on a device when a particular user is logged onto the device.

Exemplary operations of a data backup and retrieval system, according to some embodiments, will now be described with reference to FIG. 3. Content is created by a CPE device 110 and stored on a CPE device (Block 200). A descriptive file for the content is created (Block 210). For example, if a CPE device is a cell phone, and the created content is an image captured by the cell phone camera, the captured image may be given a descriptive name (e.g., image1.jpg, etc.). As described above, a descriptive file may also be metadata that describes remotely-located content that has been accessed by the CPE device, for example, via the internet, etc.

The network based storage service device 100 is configured to intelligently identify content to be backed up by comparing various types of information to pre-established rules (Block 220). For example, as described above, content to be backed up may be identified based on rules associated with content file type, content creation date, storage location on the CPE device, content priority, user identification, and/or user activity. The network based storage service device 100 utilizes these rules to decide whether to back up content and also decides where to store the identified content (Block 230).

The network based storage service device 100 is also configured to retrieve content stored at one or more remote locations (or at one or more proximity devices) and replicate the retrieved content on a CPE device (Block 240) when, for example, content has become corrupted on the CPE device, when content is lost, when the CPE device crashes, etc.

A user interface maintained by the network based storage service device 100 is updated (Block 250) whenever the network based storage service device 100 "handles" content. For example, a user interface may be updated when identified content from a CPE device is copied and stored on another device. The user interface may be updated when content is retrieved from a storage location and replicated on a CPE device, etc.

Figure 3:
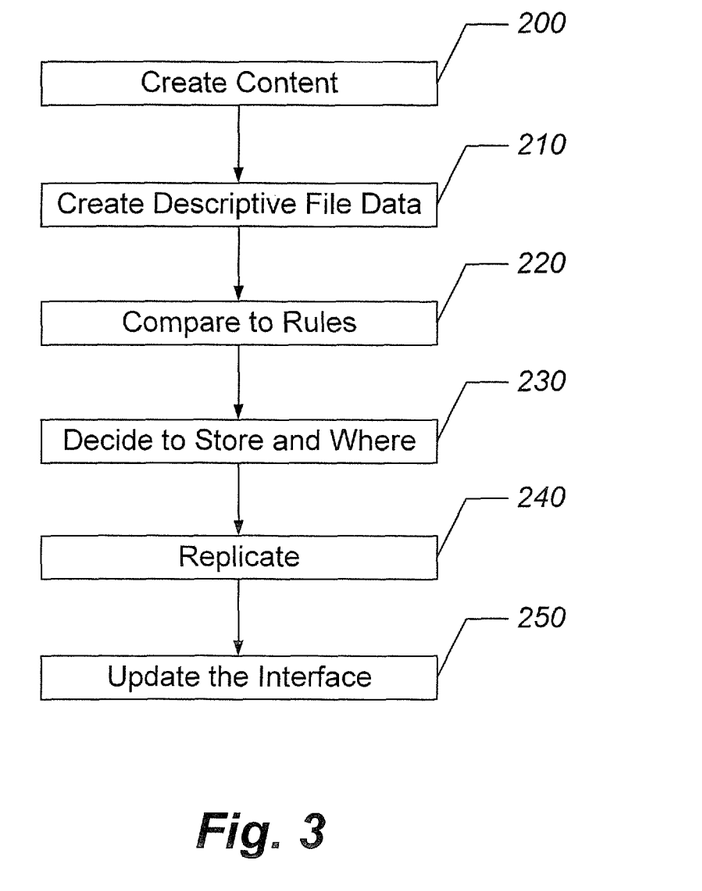
FIG. 3 is a flowchart that illustrates exemplary operations for intelligently identifying content and backing up identified content, according to some embodiments.

FIG. 3 illustrates the operations involved in identifying for backup content stored on a CPE device connected or connectable to a communications network and storing a copy of the identified content at one or more locations remote from the CPE device via the communications network. According to an exemplary embodiment, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Figure 4:
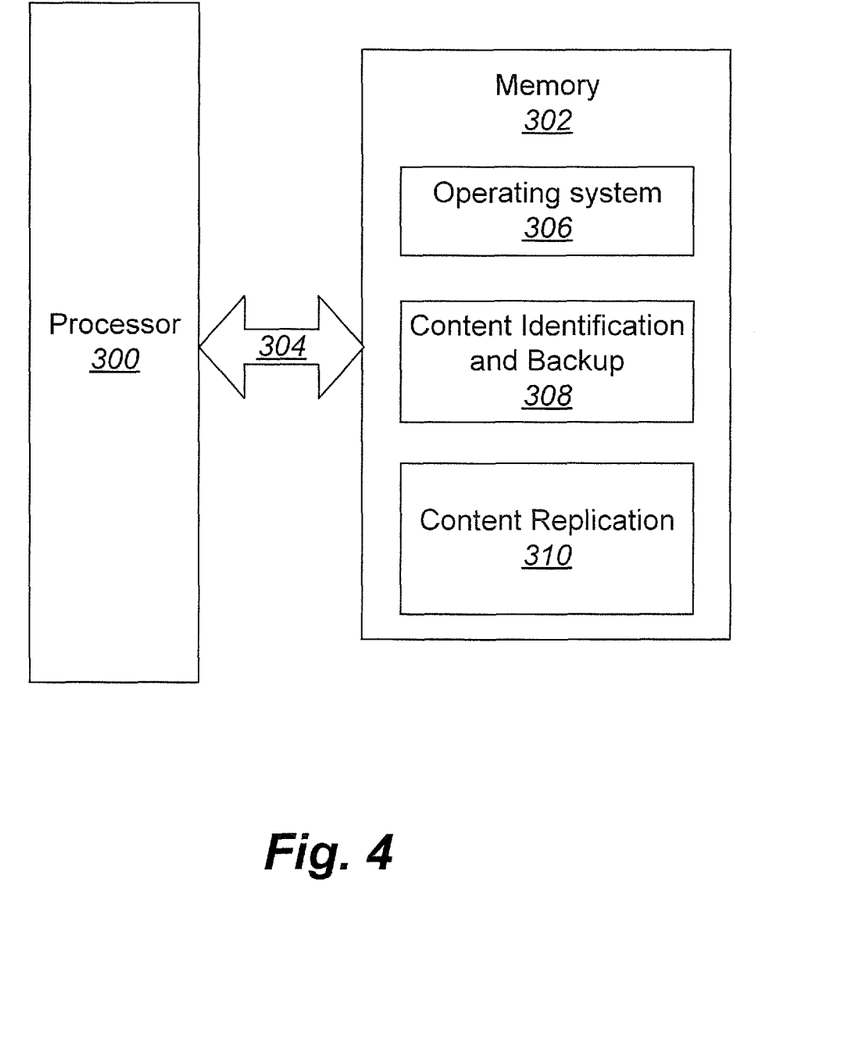
FIG. 4 is a block diagram that illustrates details of a network based storage device for intelligently identifying content and backing up identified content, according to some embodiments.

FIG. 4 illustrates details of a network based storage device 100 according to an exemplary embodiment. The device 100 includes a processor 300 and a memory 302 for identifying content for backup and storing the identified content. The processor 300 communicates with the memory 302 via an address/data bus 304. The processor 300 may be, for example, a commercially available or custom microprocessor. The memory 302 is representative of the overall hierarchy of memory devices containing the software and data used to implement a network based storage service device as described herein, in accordance with some embodiments. The memory 302 may include, but is not limited to, the following types of devices: cache, ROM, PROM, EPROM, EEPROM, flash, SRAM, and DRAM.

As shown in FIG. 4, the memory 302 may hold various categories of software and data: an operating system 306, a content identification and backup module 308, and a content replication module 310. The operating system 306 controls operations of the services provided by the device 100 (or a portion of services). In particular, the operating system 306 may manage a device's resources and may coordinate execution of various programs (e.g., the content identification and backup module 308, content replication module 310, etc.) by the processor 300.

The network based storage service device 100 can communicate in various ways with CPE devices. For example, the network based storage service device 100 can communicate with CPE devices via a communications network 120 over a wireless and/or wired connection. In some embodiments, the network based storage service device 100 can communicate with CPE devices over network protocols like HTTP or TCP/IP, etc. In addition, the network based storage service device 100 can communicate wirelessly with one or more of the CPE devices, such as via an RF communication link using an antenna. Other means of wireless communication between the network based storage service device 100 and CPE devices can be employed, such as optical infrared (IR) and/or non-line-of-sight communications links.

The content identification and backup module 308 comprises logic for intelligently identifying content from a CPE device and storing a copy of the identified content at one or more remote locations (or one or more proximity devices), as described above. The content identification and backup module 308 also comprises logic for determining one or more locations to store copies of identified content. The content replication module 310 comprises logic for retrieving content stored at the one or more remote locations and replicating the retrieved content on a CPE device, for example, when the content has become corrupted on the CPE device, when the content is lost, when the CPE device crashes, etc.

Many variations and modifications can be made to the preferred embodiments without substantially departing from the principles of the present invention. All such variations and modifications are intended to be included herein within the scope of the present invention, as set forth in the following claims.

The invention claimed is:

1. A method for automatic back-up, comprising:
establishing communication between a first mobile device and a server via a communications network;
establishing another communication between the first mobile device and a second mobile device moving in proximity to the first mobile device;
retrieving a backup rule from a memory accessible to the server, the backup rule associated with the first mobile device;
executing the backup rule by the server to identify content for a back-up service;
transferring the content from the server to the second mobile device as a restoration copy for the backup service;
determining a corruption of the content stored by the first mobile device;
sending a user interface from the server to the first mobile device, the user interface listing the content retrievable as the restoration copy from the second mobile device moving in the proximity to the first mobile device;
retrieving, at the server, the restoration copy of the content from the second mobile device; and
sending the restoration copy of the content from the server to the first mobile device.

2. The method of claim 1, further comprising executing the backup rule to identify files for backup.

3. The method of claim 1, further comprising determining priorities for back-up of data.

4. The method of claim 1, further comprising instructing the second mobile device to replicate the content.

5. A system for automatic back-up of data, comprising:
a processor; and
a memory storing code that when executed causes the processor to perform operations, the operations comprising:
establishing communication with a first mobile device, with a plurality of other mobile devices, and with a network-based storage device;
determining a second mobile device of the plurality of other mobile devices moves in proximity to the first mobile device;
retrieving a backup rule that is associated with the first mobile device;
executing the backup rule to identify sources of content previously requested via uniform resource locators by the first mobile device;
identifying key words describing the content stored in the first mobile device;
storing the uniform resource locators and the key words in the network-based storage device;
transferring restoration copies of the uniform resource locators and the key words from the network-based storage device as a backup service to the second mobile device that moves in the proximity to the first mobile device;
determining a corruption of the content stored in the first mobile device;
sending a user interface to the first mobile device that lists the uniform resource locators and the key words retrievable from the second mobile device moving in the proximity to the first mobile device;
retrieving the restoration copies from the second mobile device; and
sending the restoration copies to the first mobile device as the backup service.

6. The system of claim 5, wherein the operations further comprise identifying files for backup.

7. The system of claim 5, wherein the operations further comprise identifying a user identification associated with the first mobile device.

8. The system of claim 6, wherein the operations further comprise establishing priorities for the automatic back-up of data.

9. The system of claim 5, wherein the operations further comprise replicating the uniform resource locators.

10. The system of claim 5, wherein the operations further comprise storing the key words in different ones of the plurality of other mobile devices.

11. The system of claim 10, wherein the operations further comprise determining locations of the different ones of the plurality of other mobile devices.

12. A memory storing code that when executed causes a processor to perform operations, the operations comprising:
establishing communication with a first mobile device and with a network-based storage device;
establishing other communications with a plurality of other mobile devices moving in proximity to the first mobile device;
retrieving a backup rule that is associated with the first mobile device;
executing the backup rule to identify sources of content previously requested as uniform resource locators by the first mobile device;
identifying key words describing the content;
storing the uniform resource locators and the key words in the network-based storage device;
transferring restoration copies of the uniform resource locators and the key words from the network-based storage device to different ones of the plurality of other mobile devices as a backup service;
determining a corruption of the content stored in the first mobile device;

generating a user interface listing the uniform resource locators and the key words stored on the first mobile device and on the different ones of the plurality of other mobile devices moving in proximity to the first mobile device;

sending, to the first mobile device, a listing of the different ones of the plurality of other mobile devices storing the restoration copies;

retrieving at least one restoration copy of the restoration copies from the different ones of the plurality of other mobile devices; and sending the at least one restoration copy to the first mobile device as the backup service.

13. The memory of claim 12, wherein the operations further comprise replicating the at least one restoration copy at the first mobile device.

14. The memory of claim 12, wherein the operations further comprise identifying files for backup.

15. The memory of claim 12, wherein the operations further comprise identifying a user identification of the first mobile device.

16. The memory of claim 12, wherein the operations further comprise establishing priorities for automatic back-up of data.

17. The memory of claim 12, wherein the operations further comprise determining locations of the different ones of the plurality of mobile devices.

\* \* \* \* \*